United States Patent [19]

Berfield

[11] Patent Number: 5,675,897
[45] Date of Patent: Oct. 14, 1997

[54] ROTARY FLAIL FEEDING DEVICE

[76] Inventor: Robert C. Berfield, R.R. #4, Box 359, Jersey Shore, Pa. 17740

[21] Appl. No.: 637,044

[22] Filed: May 1, 1996

[51] Int. Cl.⁶ .................................................. B26B 27/00
[52] U.S. Cl. .......................................... 30/276; 56/12.7
[58] Field of Search ................... 30/276, 347; 56/12.7, 56/295; 242/564, 566, 557, 597.8, 613.1, 19

[56] References Cited

U.S. PATENT DOCUMENTS

| | | | |
|---|---|---|---|
| Re. 32,629 | 3/1988 | Baba et al. | 30/276 |
| 3,664,102 | 5/1972 | Reber | 56/295 |
| 3,708,967 | 1/1973 | Geist et al. | 56/12.7 |
| 3,859,776 | 1/1975 | Ballas et al. | 56/12.7 |
| 3,895,440 | 7/1975 | Pittinger, Jr. | 30/347 |
| 3,928,911 | 12/1975 | Pittinger, Jr. | 30/276 |
| 4,020,553 | 5/1977 | Pittinger | 30/347 |
| 4,035,912 | 7/1977 | Ballas et al. | 30/276 |
| 4,035,915 | 7/1977 | Pittinger, Jr. | 30/347 |
| 4,077,191 | 3/1978 | Pittinger, Sr. et al. | 56/12.7 |
| 4,091,536 | 5/1978 | Bartholomew | 30/276 |
| 4,095,338 | 6/1978 | Naohiko et al. | 30/276 |
| 4,104,796 | 8/1978 | Sheldon | 30/276 |
| 4,118,864 | 10/1978 | Pittinger, Sr. et al. | 30/276 |
| 4,138,810 | 2/1979 | Pittinger, Sr. et al. | 30/276 |
| 4,183,138 | 1/1980 | Mitchell et al. | 30/276 |
| 4,209,902 | 7/1980 | Moore et al. | 30/276 |
| 4,211,004 | 7/1980 | Woods | 30/276 |
| 4,223,440 | 9/1980 | Inaga | 30/276 |
| 4,233,735 | 11/1980 | Tsuchiya | 30/276 |
| 4,236,312 | 12/1980 | Foster et al. | 30/276 |
| 4,244,103 | 1/1981 | Snarr | 30/276 |
| 4,245,454 | 1/1981 | Zien | 56/12.7 |
| 4,274,201 | 6/1981 | Oberg et al. | 30/276 |
| 4,281,505 | 8/1981 | Fuelling, Jr. et al. | 56/12.7 |
| 4,282,653 | 8/1981 | Comer et al. | 30/276 |
| 4,285,127 | 8/1981 | Zerrer et al. | 30/276 |
| 4,290,200 | 9/1981 | Lombard | 30/276 |
| 4,316,325 | 2/1982 | Brucker | 30/276 |
| 4,335,510 | 6/1982 | Close et al. | 30/276 |
| 4,335,568 | 6/1982 | Langenstein | 56/12.7 |
| 4,347,666 | 9/1982 | Moore | 30/276 |
| 4,352,243 | 10/1982 | Lombard | 30/276 |
| 4,366,621 | 1/1983 | Mitchell | 30/276 |
| 4,366,622 | 1/1983 | Lombard | 30/276 |
| 4,411,069 | 10/1983 | Close et al. | 30/276 |
| 4,419,822 | 12/1983 | Harris | 30/276 |
| 4,426,780 | 1/1984 | Foster | 30/276 |
| 4,476,632 | 10/1984 | Proulx | 30/276 |
| 4,483,069 | 11/1984 | Moore | 30/276 |
| 4,493,151 | 1/1985 | Mitchell | 30/276 |

(List continued on next page.)

OTHER PUBLICATIONS

Japanese Utility Model Gazette Laid Open, Jan. 1, 1980–Jun. 30, 1986, pp. 1–3.
Japanese Patent Gazette Laid Open, Jul. 1, 1971–Jun. 30, 1996, pp. 1–16.
Japanese Patent Laid Open No. 63,224, Figs. 1–2, 1976, p. 108.
Japanese Patent Laid Open No. 54,833, Figs. 1–15, 1979, pp. 145–147.
Japanese Patent Laid Open No. 500,767, Figs 1, 8, 1982, pp. 34–35.
Four sheets of drawings disclosing a McCulloch "bump-feed" trimmer head which was on sale in the United States more than one year prior to the filing date of the present invention.
Nicholas P. Chironis, *Mechanisms & Mechanical Devices Sourebook*, pp. 220–227 (McGraw–Hill 1991).

*Primary Examiner*—Rinaldi I. Rada
*Attorney, Agent, or Firm*—Thomas Hooker, P.C.

[57] ABSTRACT

A rotary flail feeding device includes a head having an annular line storage cavity, a central post and annular line feeding passage extending radially inwardly from the cavity to a mouth at the end of the post. A coil of flail line is wound in the cavity and extends inwardly through the passage, around the post and out the opening. The device automatically relengthens shortened flails.

41 Claims, 3 Drawing Sheets

U.S. PATENT DOCUMENTS

| | | | |
|---|---|---|---|
| 4,524,515 | 6/1985 | Oberg | 30/276 |
| 4,550,499 | 11/1985 | Ruzicka | 30/276 |
| 4,557,052 | 12/1985 | Baba et al. | 30/276 |
| 4,566,189 | 1/1986 | Muto | 30/276 |
| 4,584,771 | 4/1986 | Tillotson | 30/276 |
| 4,599,796 | 7/1986 | Baba | 30/276 |
| 4,607,431 | 8/1986 | Gay | 30/276 |
| 4,651,421 | 3/1987 | Zerrer | 30/347 |
| 4,660,286 | 4/1987 | Engelbrecht et al. | 30/276 |
| 4,667,410 | 5/1987 | Weid et al. | 30/347 |
| 4,707,919 | 11/1987 | Tsuchiya | 30/276 |
| 4,817,288 | 4/1989 | Hirose et al. | 30/276 |
| 4,835,867 | 6/1989 | Collins et al. | 30/276 |
| 4,852,258 | 8/1989 | Foster | 30/276 |
| 4,866,846 | 9/1989 | Hoffmann et a. | 30/276 |
| 4,897,923 | 2/1990 | Collins | 30/276 |
| 4,926,557 | 5/1990 | Haupt | 30/276 |
| 4,942,664 | 7/1990 | Zatulovsky | 30/276 |
| 4,959,904 | 10/1990 | Proulx | 30/276 |
| 4,989,321 | 2/1991 | Hoffmann | 30/276 |
| 5,010,649 | 4/1991 | Hoffmann | 30/276 |
| 5,020,224 | 6/1991 | Haupt | 30/276 |
| 5,036,648 | 8/1991 | Hoffmann et al. | 56/12.1 |
| 5,063,673 | 11/1991 | Webster | 30/276 |
| 5,095,688 | 3/1992 | Fabrizio | 56/12.7 |
| 5,109,607 | 5/1992 | Everts | 30/276 |
| 5,174,100 | 12/1992 | Wassenberg | 56/12.7 |
| 5,276,968 | 1/1994 | Collins et al. | 30/276 |
| 5,339,526 | 8/1994 | Everts | 30/276 |
| 5,490,641 | 2/1996 | Worthing | 30/276 |

ROTARY FLAIL FEEDING DEVICE

FIELD OF THE INVENTION

The invention relates to a rotary flail feeding device commonly used to trim grass, weeds and light brush.

DESCRIPTION OF THE PRIOR ART

Prior flail feeding devices include a rotary head, a coiled length of flail line, typically an extruded plastic strand, confined within the head and a mechanism for incrementally feeding the line to one or two flails extending out of the head through feed passages in the outer circumference of the head. The most common flail feeding device includes a central bump button located on the head which is forced against the ground or another surface to actuate an indexing mechanism that feeds lengths of flail line out the head to reestablish the lengths of flails that have been shortened during use. Another type of flail feeding device uses a mechanism which extends a length of line every time the device head is slowed from a high operating speed.

Problems are encountered in conventional flail feeding devices. The bump button device includes complicated springs, ratchets and wear surfaces which during use tend to become gummed with mud, wet grass and the like so the device does not dispense additional line to the flails as required. These devices are massive, include many parts and are relatively expensive to manufacture and assemble. Further, maintenance of dynamic balance is difficult with these types of devices. The bump-type heads run at a high speed of rotation requiring that the head be balanced in order to prevent undesired vibration. Indexing of the heads to dispense flail line can destroy the dynamic balance of the head.

Additionally, with the bump-type heads the flail line is fed from the inside of the coil confined, in the head radially outwardly through the discharge opening. During feeding of the line the head is subjected to sharp shocks of which tend to jam the line in the coil and prevent smooth feeding of line to replenish the length of the flail. Clearing a jammed coil requires disassembly of the head, an awkward and time-consuming procedure.

The heads with automatic line feed in response to the rotation of the head have the disadvantage of always feeding additional line to the flail when the head is slowed, independent of whether additional line is actually required. In these heads extra line fed to the flail is cut off and wasted each time the head is slowed from a high operational speed.

SUMMARY OF THE INVENTION

The disclosed invention is a rotary flail feeding device for cutting grass, weeds, small scrubs and the like which during use automatically maintains the length of the flail or flails, without operator intervention. The device has an annular storage cavity surrounding the rotational axis of the head and an annular outlet opening on one side of the head surrounding the axis inside the storage cavity. A coil of flail line is held in the storage cavity and is fed radially inwardly and out the opening to provide a single flail or a pair of flails extending radially outwardly from the opening. The line extending from the cavity to the opening is wound around a central post in a direction opposite to the direction of rotation of the head and is automatically unwound from the post to increase the length of the flail or flails in response to shortening the flails during use.

Operation of the flail feeding device automatically maintains each flail at a proper operating length, without the necessity of a bump drive with an indexing mechanism or stopping and restarting the head to feed line. Inward feeding of the line from the storage cavity to and around the post and then out the opening prevents line jams.

The disclosed flail feeding device may be used with a single flail or, preferably, with two flails which are held 180 degrees apart to maintain balance and prevent vibration.

When the disclosed rotary device is stopped the line wound around the central post expands and frictionally engages a rotary line directing member to prevent undesired lengthening of the flail and waste of flail line.

The present head has few parts and may be manufactured inexpensively and assembled rapidly and cheaply. The simple construction of the device assures a long operational life. The construction with a central annular flail feed opening resists entry of foreign matter into the head.

Other objects and features of the invention will become apparent as the description proceeds, especially when taken in conjunction with the accompanying drawings illustrating the invention, of which there are three sheets and two embodiments.

DESCRIPTION OF THE PREFERRED EMBODIMENTS

Figure 1:
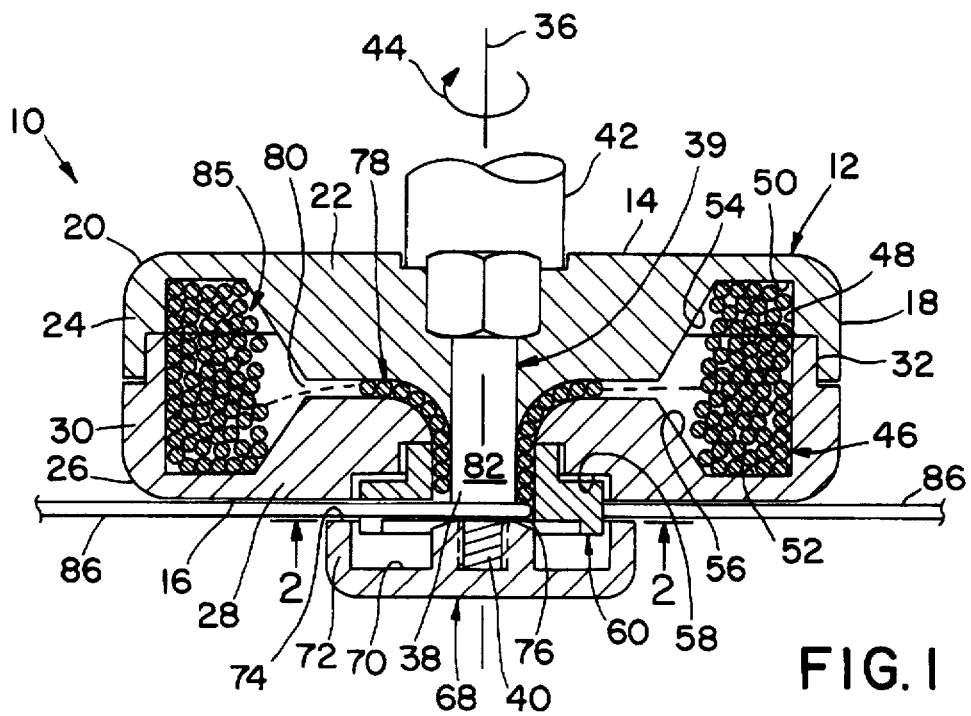
FIG. 1 is a vertical sectional view taken through the head of a first embodiment rotary flail feeding device according to the invention.

First embodiment rotary flail feeding device 10 is illustrated in FIGS. 1–5 of the drawings. Device 10 includes a rotary head 12 with flat opposed circular top and bottom sides 14 and 16 and a cylindrical outer surface 18 joining the sides. Hub 20 includes a circular top base 22 defining side 14 and an outer circumferential skirt or wall 24 extending from the outer edge of the top base partially across surface 18. Cover 26 includes a central circular bottom base 28 and an outer skirt or circumferential wall 30 extending from the outer edge of the base 28 partially across surface 18. The skirts 24 and 30 are secured together at circumferential joint 32. The hub and cover may be made from suitable material including metal or plastic.

A central post or line winding member 34 is mounted on hub 20 in alignment with rotational axis 36 of head 12. The post, which may be made of metal, rotates with the head and includes a free cylindrical end 38 extending a short distance past head side 16. Threaded extension 40 extends outwardly from post end 38. Rotary drive support member 42 is mounted on the end of the post at side 14. Drive support member 42 is attached to the output shaft of a conventional rotary drive device, which may be an electric motor or gas powered engine, to rotate the head 12 about axis 36 in the direction of arrow 44. When the head is rotated at a high operational speed a pair of flails extend radially outwardly from the head for trimming grass, weeds, light brush and the like, as will be described.

Annular line storage cavity 46 is formed in head 12 on the inside of skirts 24 and 30 and is defined by interior cylindrical wall 48 on skirts 24 and 30, top and bottom walls 50 and 52 formed in the hub and cover respectively and inwardly slopping frustoconical guide walls 54 and 56 which extend from the inner edges of walls 50 and 52 toward each other and radially inwardly toward axis 36. Cavity 46 surrounds post 34 and axis 36.

Figure 2:
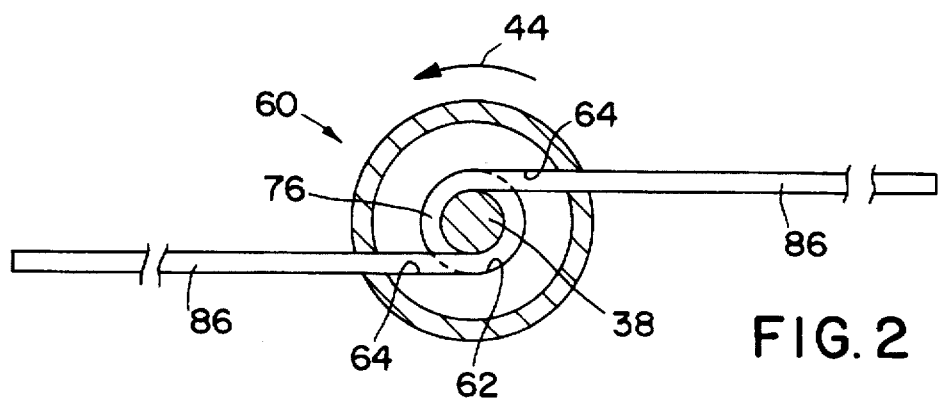
FIG. 2 is a view taken generally along line 2—2 of FIG. 1.
Figure 3:
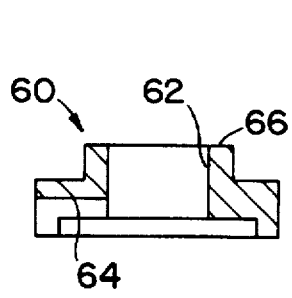
FIG. 3 is a vertical sectional view taken through the line directing member shown in FIGS. 1 and 2.

Stepped recess 58 is formed in skirt base 28 and surrounds the end 38 of post 34. Stepped line directing member 60, shown in FIGS. 1–3, is fitted in the recess and surrounds the post end 38. As illustrated in FIG. 1, the outer surfaces of the line directing member 60 are spaced from the inner surfaces of the recess 58 to permit free rotation of member 60 in head 12.

Figure 3A:
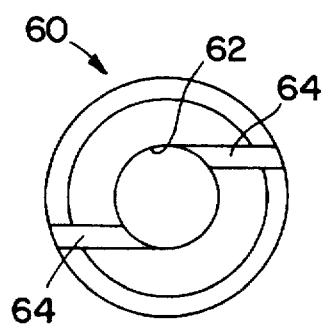
FIG. 3A is a bottom view of the line directing member.

The line directing member 60, which may be formed from metal or other suitable material, includes an interior cylindrical line brake surface 62 having a diameter greater than the diameter of the post end 38 which extends through the opening defined by surface 62. Two parallel line directing or guide grooves 64 are formed in the lower surface of member 60 and extend tangentially outwardly in opposite directions from opposed sides of surface 62 to the outer circumferential surface of the member 60. See FIG. 3A. Grooves 64 are spaced apart 180 degrees around the member 60. When the member 60 is positioned in head 12 as shown in FIG. 1 cylindrical locating surface 66 engages the bottom of recess 58 to locate the member 60 in the head with the bottom of the guide grooves 64 at the level of head side 16 to guide the flails along the side.

Circular guiding member 68 is threaded onto post end 40 and includes an annular recess 70 and an outer wall 72 having an upper guide surface 74. The guide surface 74 overlies side 16 outwardly of the stepped recess 58 and is spaced from side 16 a distance slightly greater than the diameter of the flails rotated by head 12. The outer edge of the line directing member 60 extends a distance below surface 74 into recess 70 to assure proper capture of the flails. The surface 74 holds the flails in grooves 64.

Line directing member 60 is spaced radially outwardly from post end 38 to define an annular outlet opening 76 at the end of the post. Annular line feeding passage 78 extends from opening 76 a distance into the head along post 34 and bends 90 degrees away from the post to extend radially outwardly from the post to annular inlet opening 80 opening into storage cavity 46 between the inner ends of walls 54 and 56, as shown in FIG. 1. The annular inlet opening 80 is located approximately midway between top and bottom walls 50 and 52. The top wall of passage 78 is defined by cylindrical line winding surface 82 on post 34 and the inner surface of top base 22. The bottom wall of passage 78 is defined by brake surface 62 and the inner surface of bottom base 28. The passage 78 provides unimpeded 360 degree communication between storage cavity 46 and opening 76 and facilitates feeding of flail line from the cavity to the opening.

The width of line feeding passage 78 away from post 34 is less than twice the diameter of the line fed through the passage 78 to prevent lengths of line crossing over each other and assure smooth feeding of the line from cavity 46 through the passage 78, out opening 76 and to the two flails extending outwardly from the head through guide grooves 64, as illustrated. Adjacent the post the width of the passage 78 is slightly greater than the diameter of the line.

The loading and operation of flail feeding device 10 will now be described.

Device 10 is loaded with a coil wound from two lengths of stiffly flexible flail line. This line may be extruded plastic line of the type used in conventional rotary flail-type trimming devices. The line is stiffly flexible with an inherent resiliency which tends to straighten bends.

The empty head is loaded with two lengths of flail line by unthreading guiding member 68 from post 34 and removing directing member 60 from recess 58. The ends of a pair of lines to be loaded in the head are arranged side-by-side and are then extended into the exposed end of feeding passage 78 and are pushed through the passage 78 and into storage cavity 46. During insertion, the lines are preferably oriented to wind the two flail lines around the cavity in the direction of arrow 84 shown in FIG. 4, the same direction in which the head is rotated as indicated by arrow 44. As the head is gradually rotated in a direction opposite arrow 44, the two lengths of flail line are fed side-by-side through passage 78 and into the storage cavity 46 until the cavity is filled with a coil of line 85. The free ends of the flail lines are then held against post 34 and directing member 60 is repositioned in recess 58 with the lines extending through the central opening. The two ends are then positioned 180 degrees opposite to each other with respect to the post 34 and are bent away from the post 34 and fitted in guide grooves 64 in member 60 as illustrated in FIG. 2. Guiding member 68 is then rethreaded on the end of post 34 so that the two free ends of the flail line are parallel and extend tangentially away from the post 34 in opposite directions and are spaced 180 degrees apart. Guide surface 74 on member 68 holds the free ends in place in the grooves 64 and adjacent to head side 16.

As shown in FIG. 1, cavity 46 has a relatively large capacity and holds the large coil 85 made up of both lengths of flail line. The two lengths of flail line are wound into the cavity 46 from the inside of the cavity without forming tangles. The resiliency of the flail line holds loops in the coil against the interior wall 48 to facilitate smooth inward feeding of the line from the coil to passage 78 without jams during operation of the head 12 and lengthening of the flails.

After head 12 has been loaded with flail line and assembled as described with the ends of the two lines extending outwardly from the bottom of the head, the rotary drive motor or engine is started to rotate head 12 at an operating speed about axis 36 in the direction of arrow 44.

Figure 4:
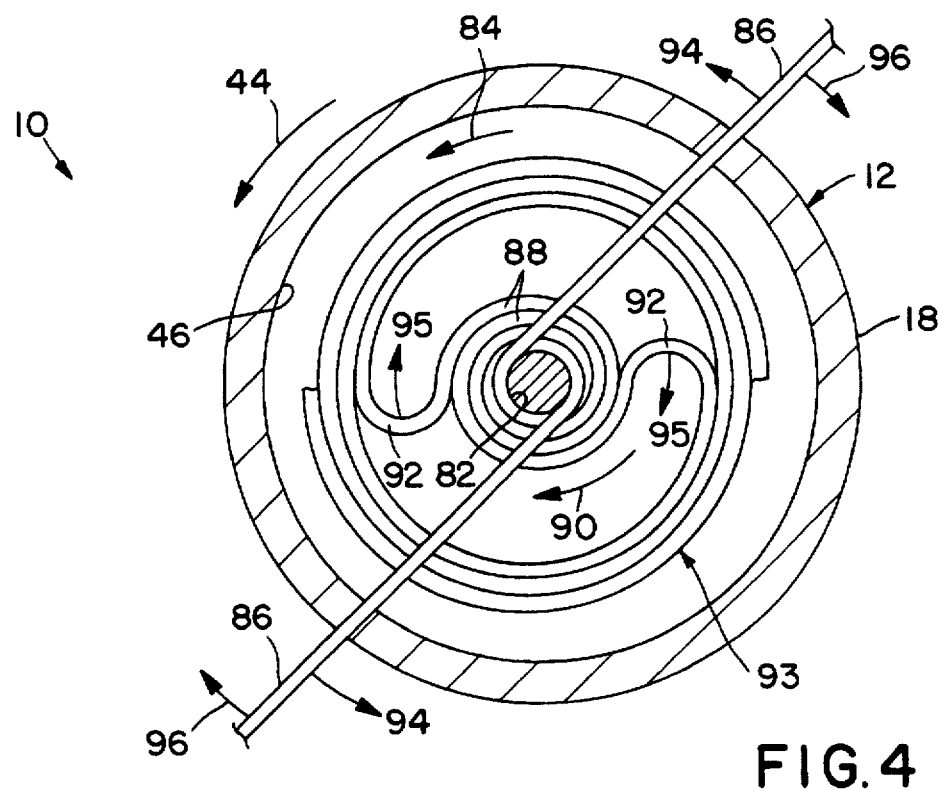
FIG. 4 is a generalized horizontal bottom view of the head shown in FIG. 1 with portions of the head removed and showing flails and line wound in the head in a first direction.

When head 12 has been accelerated to an operating speed the two ends of the flail line wound in the head are thrown radially outwardly from post 3474 to form a pair of cutting flails 86 shown in FIGS. 1, 2 and 4. The two flail lines extending from the coil 85, through passage 78 and out opening 76 are tightly spiral wound against each other in the lower inner portion of passage 78. The two lines 88 are wound into and along the passage 78 from cavity 46 to opening 76 in the direction of arrow 90 shown in FIG. 4, opposite to the direction of rotation of head 12 as indicated by arrow 44. With the two lines tightly spiral wound in the passage end around surface 82 of post or line winding member 34 as described, the two flails 86 extend tangentially outwardly in opposite directions from post 34 so that unwinding of the flails around the rotating post in the direction of arrow 44 will unwind the line from the post and lengthen the flails.

As shown in FIG. 4, the lines in coil 93 are wound around head 12 in the direction of rotation of the head and spiral windings 88 are wound into passage 78 and along surface in the opposite direction with the lines in the coil 93 connected to the lines in the spiral windings 88 by stiff 180 degree back loops 92. Loops 92 are sharply bent and are each located to one side of the post 34. The loops 92 do not extend across the post 34. Because the line is stiffly resilient and back loops 92are sharply bent, the inner ends of the loops 92 are biased toward the post 34 and hold the spiral windings 88 together in passage 78.

During initial rotation of head 12 the flails 86 and back loops 92 are subjected to centrifugal forces. The centrifugal forces acting on the flails 86 hold the spiral winding 88 tight on post winding surface 82. During initial rotation of the head 12 flails 86 unwind from the rotating post 34 in the direction of arrows 94 and are lengthened. Unwinding is caused by centrifugal forces exerted on the rotating flails 86. During unwinding the two spiral coils of line on surface 82 freely slide axially along the post 34 toward opening 76 and additional line is fed radially inwardly through loops 92 onto windings 88 from coil 93. During feeding of line to the windings the loops 92 move around the head in a direction opposite to the direction of rotation of the head, as indicated by arrows 95. Also, during unwinding the directing member 60 is rotated in head 12 in the direction of rotation of the head as indicated by arrow 94. The lengths of the flails 86 grow as line is unwound from the post 34. Additional line from storage cavity 46 is wound into passage 78, onto windings 88 and onto the post 34.

As the flails lengthen air drag is exerted on the extending rotating flails. This drag exerts forces on the flails generally in the directions of arrows 96, opposite to the direction of unwinding of the flails as indicated by arrows 94. The flails 86 continue to unwind and lengthen until the air drag forces exerted on the flails prevent further unwinding of the line and maintain the length of the flails. When this condition is reached, the opposed centrifugal and air drag forces are at equilibrium. The length of the flails at equilibrium is desirably the standard length of the flails in a conventional rotary head.

At equilibrium, the back loops 92 are rotated in the head and centrifugal forces to pull these portions radially outwardly away from the post 34 to tighten the line in spiral windings 88 in passage 78 and assist in holding the windings 88 tight on winding surface 82 on the post 34to assure that the line rotates with the head. The connection between the windings and surface 82 does not prevent axial shifting of the windings down the post 34 toward opening 76 during unwinding and lengthening of flails 86. As the flail line unwinds from post 34additional line is automatically fed from the coil 93 through loops 92 and into windings 88 to maintain the windings, as described.

After head 12 has been loaded with flail line as described and rotated to operating speed, the two flails 86 are automatically extended to an operating length. The head may then be used for trimming. During trimming, the line directing member 60 keeps the two flails 86 in 180 degree orientation on the post to maintain dynamic balance of the head.

As head 12 is used the ends of the flails are subject to wear and, in time, line material is broken off from the ends of the flails. When this occurs the air drag exerted on the shortened flails is reduced. Shortening of the flails reduces the air drag forces to a greater extent than the shortening of the flails reduces the centrifugal forces, with the result that equilibrium is destroyed and the centrifugal forces unwind the flails from the rotating post 34 in the forward direction of arrow 94 until the increase in length of the flails increases the air drag sufficiently to reestablish equilibrium between the two forces and reestablishes the length of the flails. During simultaneous lengthening of both flails, member 60 is rotated around post 34 in the direction of rotation of head 12.

If only one flail is shortened, this line is lengthened, as described, and the member 60 is rotated on the head to unwind the other flail a distance around the post until an equilibrium is again established. In this event, the shortened flail will be slightly shorter than the unshortened flail. In time, both flails will wear and have the same length.

The lengths of the flails are automatically maintained as described during trimming using head 12, thereby eliminating the necessity of operator intervention to maintain the flail length and full trimming efficiency.

Often during trimming and at the end of a trimming job it is necessary to stop rotation of head 12. When the rotational speed of the head is slowed, the spiral windings of coils 88 in passage 78 relax and expand due to the resiliency of the line material. When this happens, the coils on the lower end of the passage 78 at the end of post 3438 expand and engage the interior brake surface 62 of directing member 60 so that the member 60 cannot rotate relative to the windings. At this time, the resilient back loops 92 extending between the coils of line material in cavity 46 and the windings hold the windings tightly together to maintain tight windings 88 in the passage 78. As the head 12 slows the tight windings in the passage 78 prevent the coils on the end of the post 34 from rotating thereby holding the directing member 60 against rotation relative to the head 12 so that line material is not fed to the flails and the length of the flails is maintained. The back loops 92 maintain tension in the windings or loops during restarting of the head 12 and rotation back to operating speed to prevent elongation of the flails during start-up, prior to reestablishing equilibrium.

The flail line is fed freely radially inwardly from the coils in cavity 46, past guide walls 54 and 56, through inlet opening 80 and into the passage 78 without crossover or wedging jams. Once in the passage 78, the lines are tightly wound together to form spiral windings and move freely through the passage 78 to replace material removed from the ends of the flails and lengthen the flails.

During operation of head 12 directing member 60 rotates relative to the head 12 in the direction of rotation of the head as flail line is fed from the windings 88 outlet opening 76 to lengthen flails 86. During this rotation the directing member 60 rotates on the outer surfaces of the line coils or windings on winding surface 12, which serve as a renewable bearing for the directing member 60. The directing member 60 is preferably formed of material harder than the plastic forming the lines so that wear at the bearing occurs in the line material which is being fed out of the head 12. This wear is inconsequential to the trimming operation and reduces wear on the directing member 60. The directing member 60 also rotates on the bottom of recess 58 at rotating surface 66. Axial load is low and wear at this surface is minimal.

The head 12 may be mounted on a conventional type string trimmer with a trimming blade located a distance radially outwardly from the head for trimming overlong flails.

Figure 5:
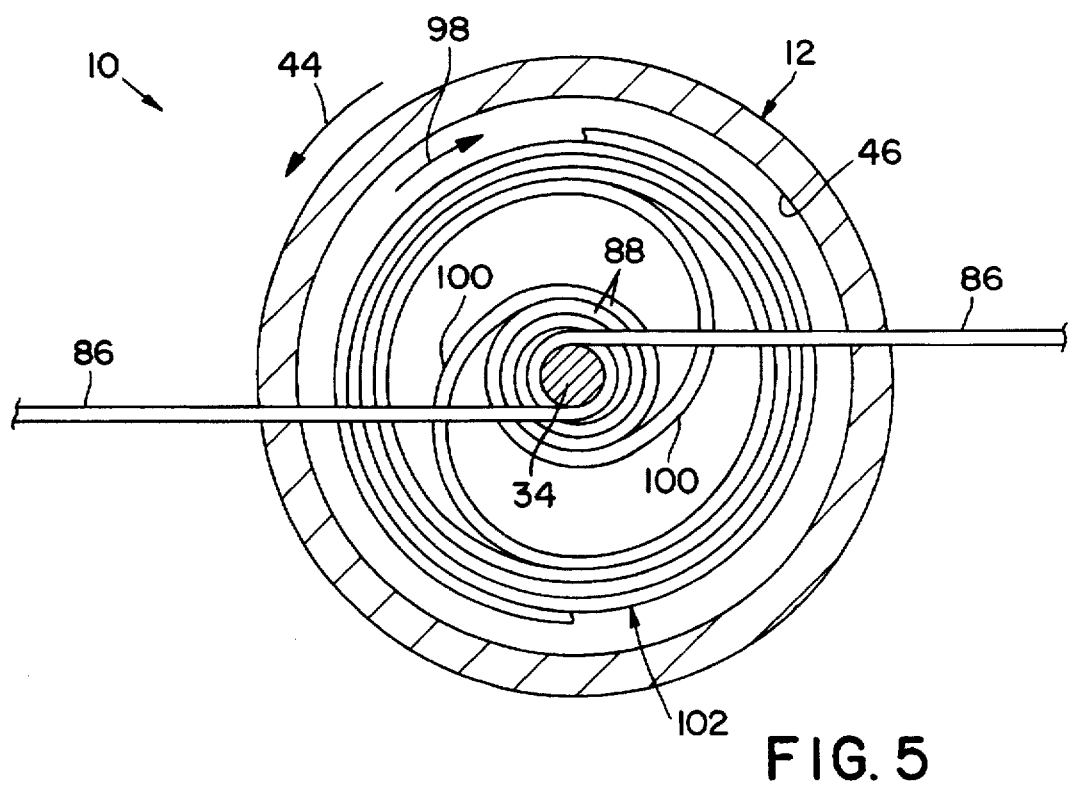
FIG. 5 is a view similar to FIG. 4 showing the line wound in the head in a second direction.

FIG. 5 illustrates the interior of head 12 in which line has been wound in cavity 46 in the direction of arrow 98, opposite to the direction of rotation of the head 12 as indicated by arrow Two lengths of flail line are wound into the cavity 46 to fill the cavity. The ends of the line are fed through the passage 78 and outlet opening 76. The directing member 60 and guiding members 68 are then mounted on the head 12 as previously described with the two ends fitted in the guide grooves 64 and extending outwardly away from the post 34 as shown in FIG. 2.

Upon initial rotation of the FIG. 5 head the lines are tightly spiral wound in passage 78 with the lower ends of the lines wound around and engaging winding surface 82 as previously described. Flails 86 extend outwardly from the post 34 and are automatically adjusted in length as previously described. The inner ends of the tight spiral windings 88 in passage 78 are connected to the wound coils of line material in cavity 46 by flexible crossing loops 100 which extend inwardly from coil 102 past to one side of post 34 and join the tight spiral winding 88 on the opposite side of the post. When the head 12 is slowed to a stop, the crossing loops 100 tend to assume a straight position and tend to open the spiral windings 88, loosen the windings in passage 78 and may permit limited rotation of the directing member 60 relative to the head 12. Such rotation unwinds short lengths of line from the post 34 and lengthens the flails 86 short distances beyond the equilibrium positions.

Figure 6:
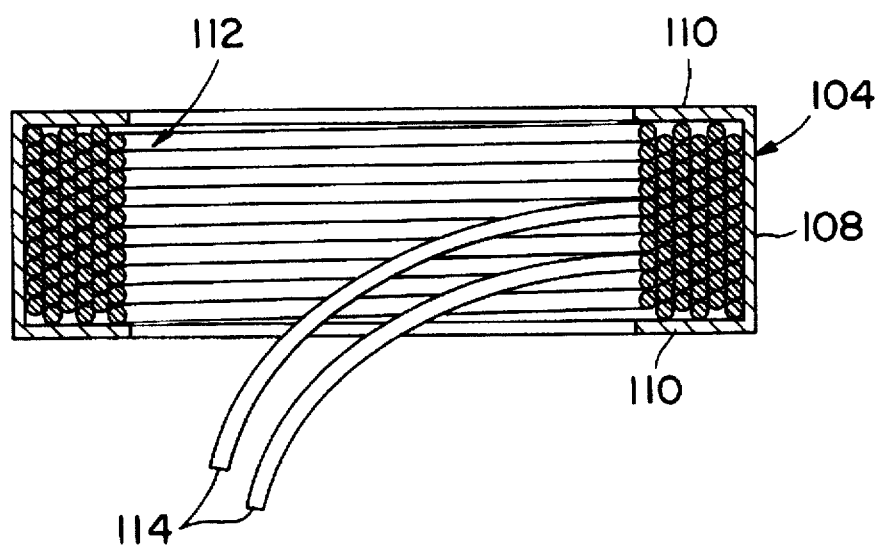
FIG. 6 is a vertical sectional view through a line cartridge.
Figure 7:
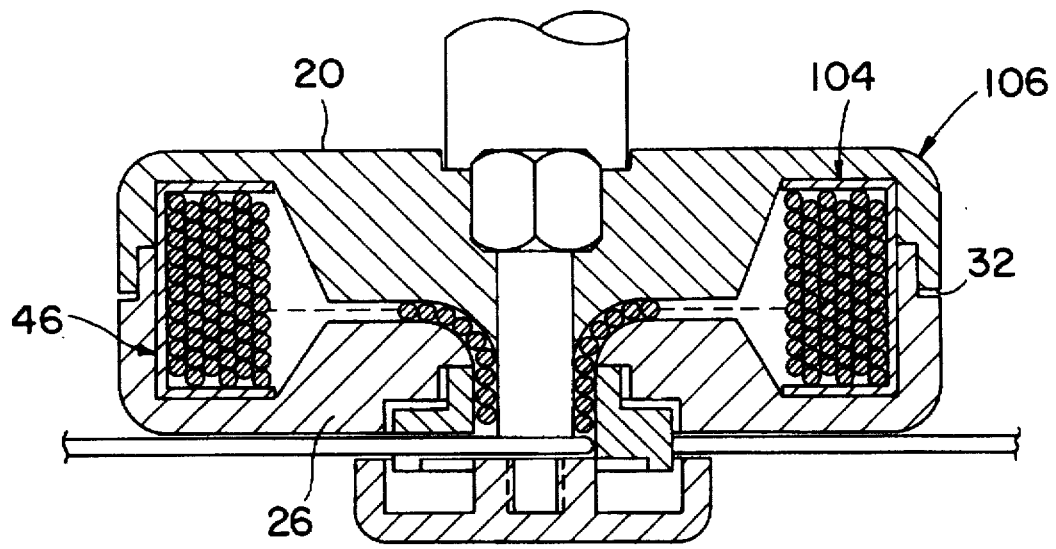
FIG. 7 is a vertical sectional view of a second embodiment rotary flail feeding device using a cartridge as shown in FIG. 6.

FIG. 6 illustrates a flail line cartridge 104 adapted to be loaded in head 106 shown in FIG. 7. The cartridge 104 includes a cylindrical wall 108 with a pair of radially inwardly extending flanges 110 on the upper and lower edges of the wall. The wall 108 and flanges 110 define an interior space in which two lengths of flail line are pre-wound to form a coil 112 with free ends 114 extending outwardly through the center of the cartridge.

Head 106 is like head 12 with the exception that the cover 26 is removable from hub 20 at joint 32 to open the storage cavity 46 for reception of the cartridge 104 with pre-wound coil 112. The cartridge is preferable provided with indicia, such as an arrow extending around the outer surface of one of the flanges 110, to indicate the proper orientation of the cartridge in the head so that during use back loops 92 are formed in the portions of the line extending inwardly to the tight spiral windings in passage 78, as illustrated in FIG. 4.

The cartridge with pre-wound line coil is loaded into head 106 by removing the guiding member and directing member, as previously described, opening the head 106 at joint 32 and then placing the cartridge 104 in the portion of the storage recess 46 in the hub 20. The free line ends 114 are then led along the central surface of the hub 20 and along the end of post 34. These ends are fed through the central opening in cover 26 which is then positioned on the hub 20 to close the head 106. Directing and guiding members 60 and 68 are then reattached to the head as previously described. The indicia on cartridge 104 facilitates placement of the cartridge in the head with the coil wound into the cartridge in a direction opposite to the direction of rotation of the head for forming of back loops during operation.

After the cartridge 104 has been placed in head 106 as described the head 106 is rotated by the drive and the lengths of the two flails are extended and adjusted automatically, as previously described.

The described rotary flail feeding devices each include a pair of flails oriented 180 degrees across post 38. Two flail heads are balanced dynamically and operate smoothly. However, if desired, the disclosed heads may be operated with a single flail, the length of which is automatically adjusted and lengthened as previously described. Line directing member 60 is not required to maintain proper flail length, and may be omitted if desired.

While I have illustrated and described my invention in connection with flail feeding devices particularly useful in trimming grass, weeds and small shrubs, it is understood that this is capable of modification, and I therefore do not wish to be limited to the precise details set forth, but desire to avail myself of such changes and alterations as fall within the scope of the following claims.

What I claim as my invention is:

1. An automatic flail feeding device comprising a rotary head having opposed first and second sides; a circumferential skirt extending between the sides; a rotary drive support member on the first side of the head, said member adapted to attach the head to an output of a rotary drive to rotate the head in a direction about an axis extending through said sides; the head including a central winding member mounted on said first side of the head and extending along the axis to an annular outlet opening in said second side of the head; a line winding surface on an end of the winding member; an annular line storage cavity located within the head between said sides and a distance radially outwardly from the winding member, a 360 degree line feed passage having an annular inlet opening located radially inwardly from and facing the line storage cavity, said line feed passage extending from the inlet opening radially inwardly toward the winding member and along the line winding surface to the outlet opening; said first side of the head defining a first interior surface on one side of the passage and said second side of the head defining a second interior surface on the other side of the passage.

2. A device as in claim 1 including a line directing member rotatably mounted on the head and surrounding the end of the winding member.

3. A device as in claim 2 including a guiding member mounted on the end of the winding member and overlying the line directing member.

4. A device as in claim 2 wherein said line directing member includes a line brake surface overlying the winding surface and a first line guide.

5. A device as in claim 4 wherein said line directing member includes a second line guide spaced 180 degrees from said first line guide.

6. A fail feeding device comprising a rotary head having opposed sides; a support member on the head adapted to attach the head to a rotary drive for rotating the head about an axis in a direction of rotation; an annular line storage cavity inside the head extending around and located a distance radially outwardly from the axis; a line winding member attached to one side of the head and rotatable with the head, said winding member extending along the axis to an end at the other side of the head; a line winding surface on the winding member adjacent the other side of the head; and annular outlet opening on the other side of the head extending around the end of the winding member; a 360 degree line feeding passage in the head extending from the storage cavity, past the winding surface and to the outlet opening; and a line directing member rotatably mounted on said other side of the head, said line directing member surrounding the end of the line winding member and having a line brake surface overlying the winding surface.

7. A device as in claim 6 wherein said line directing member includes a first line guide located radially outwardly from the brake surface.

8. A device as in claim 7 wherein said line directing member includes a second line guide, said guides located 180 degrees across from each other.

9. A device as in claim 8 wherein each said guide comprises a groove, said grooves extending parallel to each other and tangentially away from the outlet opening in opposite directions.

10. A device as in claim 9 including a guiding member attached to the end of the line winding member and overlying the line directing member.

11. A flail feeding device comprising a rotary head having opposed sides; a support member on the head adapted to attach the head to a rotary drive for rotating the head about an axis in a direction of rotation; and annular line storage cavity inside the head extending around and located a distance radially outwardly from the axis, said cavity located between said opposed sides of the head; a line winding member attached to one side of the head and rotatable with the head, said winding member extending along the axis to an end at the other side of the head; a line winding surface on the winding member adjacent the other side of the head; an annular outlet opening on the other side of the head extending around said end of the winding member; and a 360 degree line feeding passage in the head, said passage opening into the storage cavity between said opposed sides and extending radially inwardly from the storage cavity, past the winding surface and to the outlet opening.

12. A device as in claim 11 wherein the head includes a hub on said one side of the head having a hub interior surface and a cover on said other side of the head having a cover interior surface, said interior surfaces extending circumferentially around the axis and defining the line feeding passage.

13. A device as in claim 12 including a joint located at the outer circumference of the head securing the hub and cover together.

14. A device as in claim 12 wherein the line feeding passage opens into the cavity approximately midway between said opposed sides.

15. A device as in claim 14 including a sloping line guide wall in the head extending to the line feeding passage.

16. A device as in claim 11 wherein said line feeding passage includes a first portion located adjacent the outlet opening extending essentially parallel to the axis, a bend away from the axis and a second portion extending to the storage cavity.

17. A device as in claim 16 wherein said second portion of the line feeding passage extends radially outwardly from the winding member.

18. A device as in claim 11 wherein the line feeding passage includes a 90 degree bend and opens into the center of an inner wall of the storage cavity.

19. A device as in claim 11 including an annular flail line cartridge fitted in the storage cavity.

20. A device as in claim 11 wherein said line winding member comprises a cylindrical post.

21. A device as in claim 11 including a first continuous length of flail line, said length of flail line having a large diameter wound coil in the line storage cavity, a first portion extending from the wound coil radially inwardly into the line feeding passage to the winding surface, a small diameter coil wound on the line winding surface in a direction opposite to the direction of rotation of the head and a second portion extending out the outlet opening to form a flail.

22. A device as in claim 21 including an annular cartridge in said storage cavity, said wound coil fitted in said cartridge.

23. A device as in claim 21 wherein the small diameter coil extends a distance radially outwardly from the winding surface.

24. A device as in claim 14 wherein said first portion includes a back loop located to one side of the winding member.

25. A device as in claim 21 wherein the width of the line feeding passage is less than twice the thickness of the flail line.

26. A device as in claim 21 including a second continuous length of flail line having a large diameter wound coil in the line storage cavity, a first portion extending from such wound coil radially inwardly into the line feed passage to the winding surface, a small diameter coil wound on the line winding surface between coils of the first length of flail line and a second portion extending out the outlet opening to form a flail.

27. A device as in claim 26 wherein the width of the line feeding passage is less than twice the thickness of the flail line.

28. A device as in claim 27 including a line directing member rotatably mounted in the head surrounding the line winding surface and defining a line brake surface overlying the winding surface, and a pair of line guide openings spaced approximately 180 degrees apart on said line directing member, said flails extending through said guide openings.

29. A device as in claim 28 wherein said line guide openings comprise parallel slots extending tangentially away from the outlet opening.

30. A device as in claim 29 including a guiding member mounted on the end of the winding member overlying the line directing member.

31. A device as in claim 11 including an annular cartridge in said line storage cavity; and a first coil of flail line in the cartridge.

32. A device as in claim 31 wherein a length of flail line extends from the coil through the line feeding passage and out the annular outlet opening.

33. A device as in claim 32 wherein said length of flail line includes a second coil of flail line surrounding the line winding member.

34. The method of operating a rotary flail of the type having a rotary head with an annular line storage cavity with top and bottom walls and a large diameter coil of flail line in the cavity, comprising the steps of:

a) rotating the head and the coil in a first direction about an axis extending through the center of the cavity; and b) extending rotating flail line from the coil radially inwardly and out of the cavity between the top and bottom walls, winding the line around a winding surface located at the center of the cavity and surrounding the axis in a second direction opposite to the direction of rotation of the head around the axis to form a small diameter coil of line on the surface, and extending the flail line out of the head through an annular opening at an end of the surface and radially away from the opening to form a flail having a free end.

35. The method of claim 34 including the steps of:

c) exerting a centrifugal force on the flail tending to unwind the flail from the surface in the direction of rotation of the head and thereby lengthen the flail;

d) exerting a drag force on the flail tending to wind the flail on the surface a direction opposite to the direction of rotation of the head and thereby shorten the flail; and e) maintaining the length of the flail by establishing an equilibrium between the centrifugal force and the drag force.

36. The method of claim 35 including the step of:

f) exerting a centrifugal force on a rotating portion of the flail line extending between the coils to tighten the small coil on the winding surface.

37. The method of claim 36 including the steps of:

g) removing material from the free end of the flail to reduce the length of the flail;

h) lengthening the flail by rotating the flail around the winding surface in the direction of rotation of the head to reestablish equilibrium between the centrifugal force and the drag force; and i) feeding flail line from the large coil to the small coil.

38. The method of claim 34 including the steps of:

c) slowing rotation of the head about the axis; and d) then biasing a portion of the line extending between the coils against the small diameter coil to tighten the coil on the winding surface.

39. The method of claim 38 including the step of:

e) forming a back loop in the line extending between the coils.

40. The method of claim 34 including the steps of:

c) winding two lengths of flail line in the storage cavity and feeding portions of each length from the cavity radially inwardly, around the winding surface and out the opening to form two flails; and d) maintaining each flail spaced apart 180 degrees in the opening.

41. The method of claim 40 including the step of:

e) stopping rotation of the head while preventing feeding of additional flail line out to the opening.

* * * * *

UNITED STATES PATENT AND TRADEMARK OFFICE
CERTIFICATE OF CORRECTION

PATENT NO. : 5,675,897

DATED : October 14, 1997

INVENTOR(S) : Robert C. Berfield

It is certified that error appears in the above-identified patent and that said Letters Patent is hereby corrected as shown below:

In the Title Page:
   Column 2, line 15, following "1980-Jun. 30", change "1986" to --1996--.
   Column 2, line 29, change "Sourebook" to --Sourcebook--.

Column 1, line 36, delete ",".
   Column 4, line 55, change reference numeral "3474" to reference numeral --74--.
   Column 5, line 54, following "from" insert --the--.
   Column 6, line 26, change reference numeral "3438" to reference numeral --38--.

Column 6, line 53, change reference numeral "12" to reference numeral --82--.
   Column 7, line 2, following "arrow" insert --44.--

In the Claims:
   Claim 6, line 1, change "fail" to --flail--.
   Claim 6, line 11, change "and" to --an--.
   Claim 11, line 4, change "and" to --an--.
   Claim 24, line 1, change "14" to --21--.

Signed and Sealed this

Twenty-fourth Day of February, 1998

Attest:

*Attesting Officer*

BRUCE LEHMAN

*Commissioner of Patents and Trademarks*